United States Patent [19]

Suezaki

[11] Patent Number: 4,624,293
[45] Date of Patent: Nov. 25, 1986

[54] TREE PRUNING MACHINE

[75] Inventor: Yasunaga Suezaki, Yame, Japan

[73] Assignee: Kaisei Kogyo Corporation, Kumamoto, Japan

[21] Appl. No.: 733,271

[22] Filed: May 10, 1985

[30] Foreign Application Priority Data

May 31, 1984 [JP] Japan .............................. 59-113730

[51] Int. Cl.$^4$ .......................... A01G 23/02; B27L 1/00
[52] U.S. Cl. .................................... 144/2 Z; 144/343; 144/356
[58] Field of Search ............. 144/2 Z, 3 D, 338, 343, 144/356, 357

[56] References Cited

U.S. PATENT DOCUMENTS

| | | | |
|---|---|---|---|
| 3,030,986 | 4/1962 | Longert | 144/2 Z |
| 3,356,113 | 12/1967 | Perugia | 144/2 Z |
| 3,385,332 | 5/1968 | Otterbach et al. | 144/2 Z |
| 3,451,448 | 6/1969 | Michener | 144/2 Z |
| 3,454,058 | 7/1969 | Fend | 144/2 Z |
| 3,457,973 | 7/1969 | Meier | 144/2 Z |
| 3,545,509 | 12/1970 | Baxter, Jr. | 144/2 Z |
| 4,527,603 | 7/1985 | Hori | 144/2 Z |

Primary Examiner—W. D. Bray
Attorney, Agent, or Firm—Townsend and Townsend

[57] ABSTRACT

A tree pruning machine having an elevating body detachably mounted to a standing tree and a cutting unit detachably mounted on the body and capable of rotating around the periphery of the body comprising at least three sets of wheel units mounted on the body and capable of moving radially towards and away from the tree, each including a plurality of upper and lower wheels for elevating the body vertically on the tree, an interlocking mechanism for interlocking the wheel units to each other for simultaneously moving the wheel units by the same radial distance, and a pressure equalizing mechanism having springs for biasing the wheels of the respective wheel units equally against the surface of the tree. Thus, even if the tree T varies in diameter, the pruning machine A cuts the branch t at the root while stably and reliably climbing the tree T and automatically descends the tree T when the tree pruning work is finished.

2 Claims, 15 Drawing Figures

FIG.1-(A)
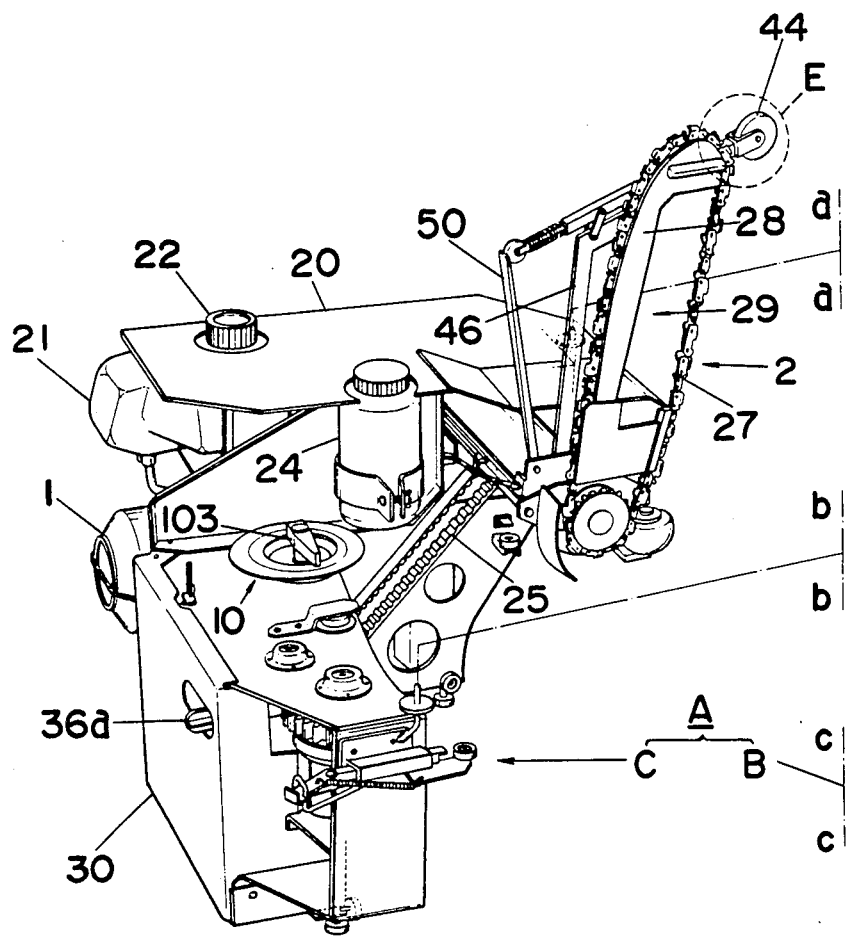

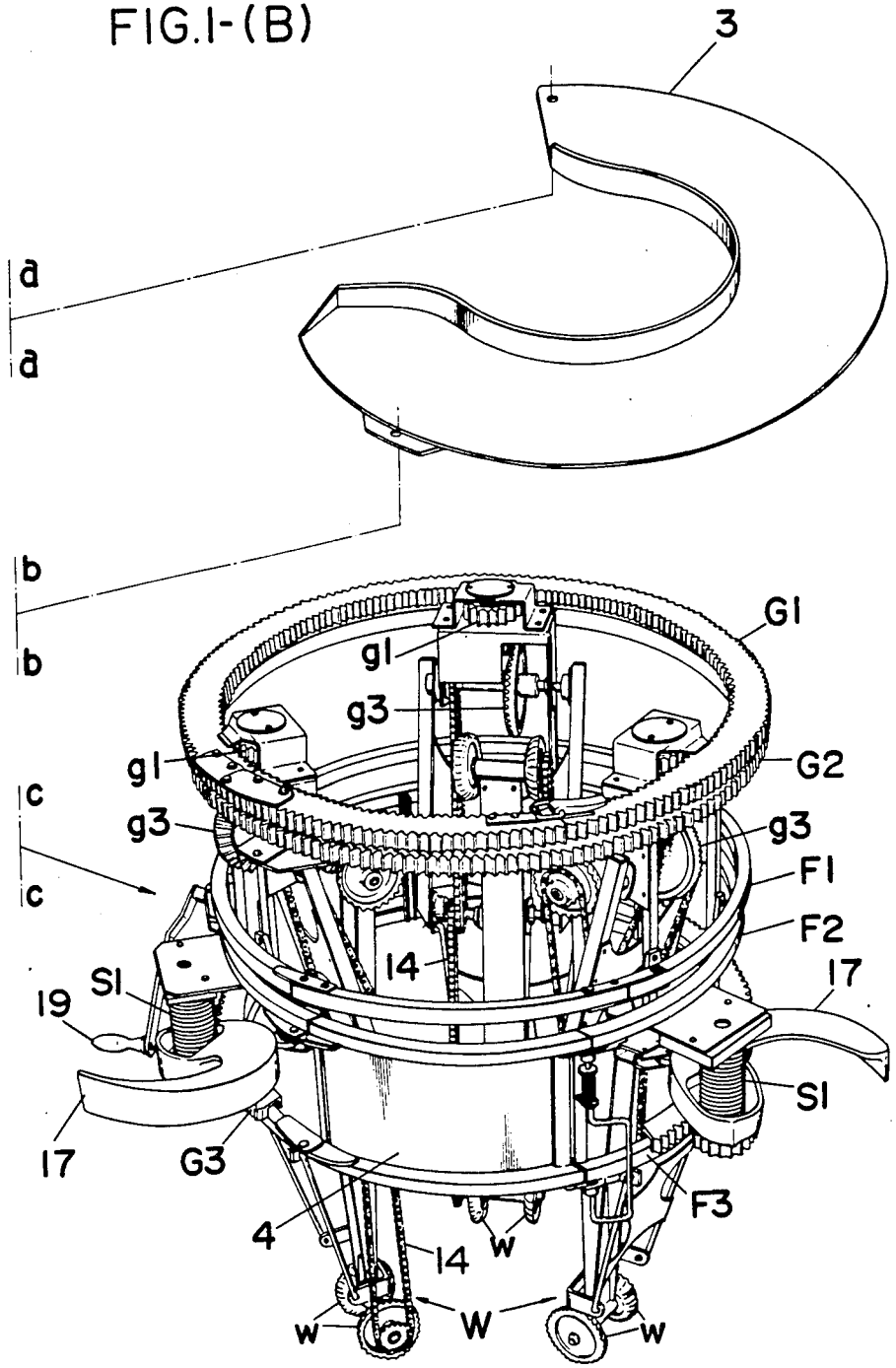

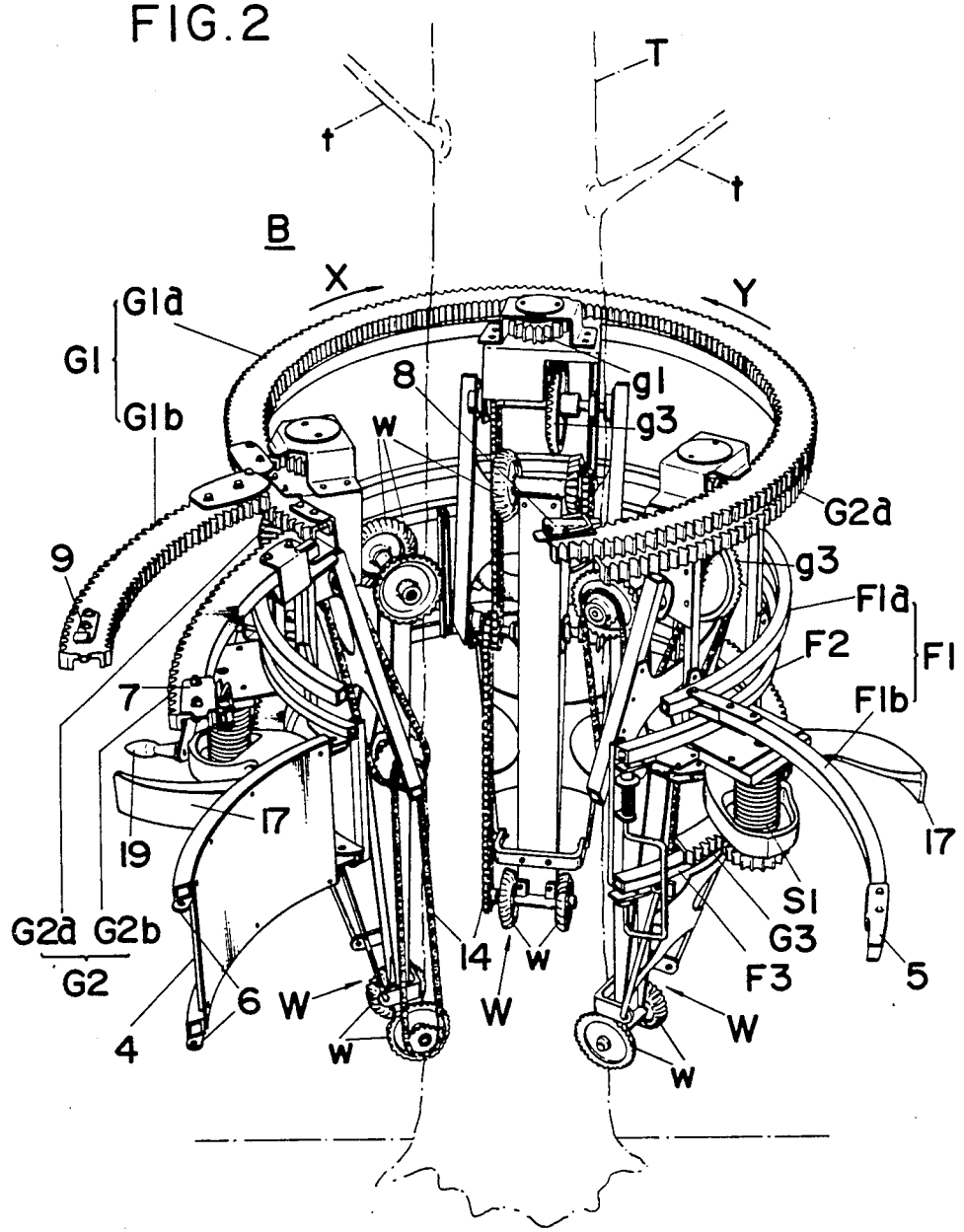

TREE PRUNING MACHINE

BACKGROUND OF THE INVENTION

1. Field of the Invention

This invention relates to a tree pruning machine for cutting branches of a standing tree while climbing the tree and, more particularly, to a tree pruning machine having a body mounted on the standing tree and capable of vertically climbing the tree, and a rotary unit detachably mounted on the body for cutting branches projecting from the surface of the standing tree while the unit rotates around the body.

2. Description of the Relevant Literature

Tree pruning is necessary for cultivating high-grade timber without knots, for preventing damage by harmful insects or by snow, for accelerating growth of standing trees, for effectively utilizing a forest, or for pruning branches. Traditional branch pruning has been done manually. Since pruning is often done in mountains and other rugged terrain, the work has been very severe on labor, and a number of accidents have inevitably occurred. Additionally, the forest workers are often aged, and they are often incapable of withstanding the excessive demands on their ability, resulting in an overall decrease in the ability to meet present demands for branch pruning.

In view of the foregoing, automated tree pruning has been eagerly desired in the foresting industry. A variety of tree pruning machines have been proposed, but these tree pruning machines lack certain fundamental requirements. Particularly, a tree pruning machine must be capable of effectively climbing up and down a standing tree given the fact that trees gradually decrease in diameter from the root upwardly. To do this, a climbing mechanism must be capable of maintaining sufficient contact force with the surface of the tree despite the tree's varying diameter. Furthermore, the tree pruning machine must be stable as it climbs up and down the tree. If the pruning machine rocks while climbing up or down the tree, the cutting unit may cut into the bark of the tree, thereby damaging it, or the cutting unit may fail to cut the branch close enough to the tree trunk, thus allowing the root of the branch to remain as residual branches. These residual branches become head knots which decrease the commercial value of the timber. Additionally, the residual branches become obstacles to the pruning machine as it travels up and down the tree. Therefore, in order to satisfactorily prune the tree, the pruning machine must be capable of disposing the tree at the center of the machine regardless of changes in the diameter of the tree trunk.

The foregoing fundamental requirements for tree pruning machines are indispensable, and conventional tree pruning machines have not met such requirements, so an ideal tree pruning machine has not yet been invented.

SUMMARY OF THE INVENTION

An object of the present invention is to provide a novel tree pruning machine which satisfies the indispensable fundamental requirements described above.

The present invention is a tree pruning machine having a generally annular body detachably mounted around a standing tree and capable of climbing up and down the tree, and a cutting device detachably mounted on the body and capable of rotating around the periphery of the body. Disposed radially within the body is a linkage mechanism having at least three sets of wheel units, each wheel unit including a plurality of upper and lower wheels for elevating the body vertically on the tree. To maintain the tree centered within the body, an interlocking mechanism interlocks the wheel units to each other so that each wheel unit always moves the same radial distance as the other wheel units and a pressure equalizing mechanism having springs for equally biasing the respective wheel units against the surface of the tree ensures uniform contact pressure on the tree surface. Thus, the tree pruning machine can reliably and stably climb up and down the standing tree while maintaining the tree as a center and effectively cutting the branches.

The foregoing objects as well as the fundamental features of the invention will become more fully apparent and more readily understandable by the following description and the appended claims when read in conjunction with the accompanying drawings.

BRIEF DESCRIPTION OF THE DRAWINGS

FIGS. 1-(A) and 1-(B) are perspective exploded views of an embodiment of a tree pruning machine according to this invention.

FIG. 2 is a perspective view of the body of the pruning machine;

DETAILED DESCRIPTION OF THE PREFERRED EMBODIMENTS

Figure 3:
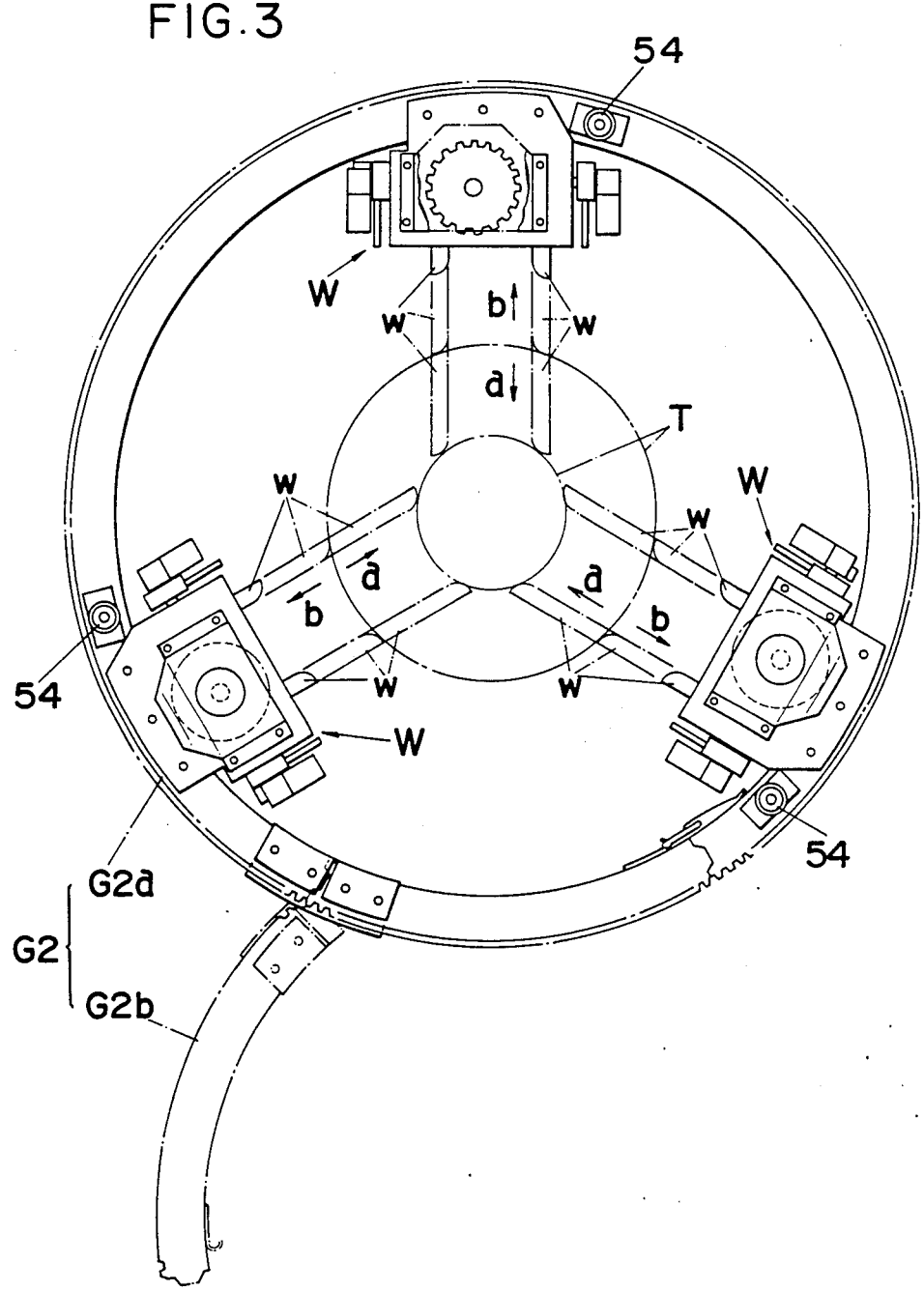
FIGS. 3 and 4 are plain views showing a wheel unit.

An embodiment of this invention will be described in detail with reference to the accompanying drawings.

FIGS. 1-(A) and 1-(B) are perspective exploded views of an embodiment of a tree pruning machine according to this invention. The tree pruning machine A comprises an elevating body B and a rotary device C detachably mounted thereon. The body B has a number of elevating wheels w which rotate along the vertical direction of the standing tree. When the wheels w are driven by an engine 1 carried on the rotary device C, the body - B climbs the standing tree.

The rotary device C is detachably mounted on the body B. When the body B climbs the tree, a cutting unit 2 having a chainsaw 27 cuts branches projecting from the surface of the tree near the trunk while rotating around the body B.

A cover plate 3 is detachably mounted on the rotary device C. When pruning machine A cuts branches while climbing the tree, the cover plate 3 prevents the branches cut by the cutting unit 2 from dropping into and damaging the rotary device C and the body B.

The engine 1, mounted on rotary device C, drives the wheels w of the body B and the cutting unit 2 of the rotary device C, so that the pruning machine A cuts the branches while slowly climbing the standing tree. When the pruning machine A has completed a prescribed amount of pruning, the machine A rapidly descends vertically along the standing tree.

To cut the branches of the standing tree while reliably climbing the tree, the tree is disposed at the center of pruning machine A. This is accomplished by the following three mechanisms:

(1) A linkage mechanism mounts the wheel units on the body B so as to allow radial movement with respect to the axis of the tree.

(2) An interlocking mechanism interlocks the wheel units so that each wheel unit simultaneously moves the same radial distance.

(3) A pressure equalizing mechanism having springs ensures that the wheel units contact the surface of the tree with equal pressure.

These three mechanisms will now be described in detail with reference to the accompanying drawings.

FIG. 2 is a perspective view of the body B disposed on a standing tree T illustrated in phantom. The body B has as main frames circular frames F1, F2, and F3, on which a variety of components to be described below are respectively mounted. Arranged at the uppermost portion of the body B is a movable large ring gear G1 formed with teeth on both inner and outer peripheral surfaces. When the pruning machine A climbs the tree T, the ring gear G1 turns in the direction of arrow X by the drive of the engine 1 and transmits a normal rotation to the respective wheels w. When the pruning machine A descends the tree T, the ring gear G1 turns in the direction of arrow Y which in turn rotates the wheels w in the reverse direction.

Disposed directly under the ring gear G1 on body B is a stationary large ring gear G2 formed with teeth on its outer peripheral surface. The ring gear G2 is mounted securely to the frame and does not turn in the direction of the arrows X and Y as does the ring gear G1. When the body B climbs the tree T, the rotary device C cuts the branches t with the cutting unit 2 while rotating along the ring gear G2 in such a manner that ring gear G2 becomes the rotation guiding locus of the rotary device C.

A large arcuate interlocking ring gear G3 is disposed directly above the frame F3 and surrounds the tree T. Ring gear G3 acts as an interlocking unit for the wheel units W in order to hold the tree at the center of the body B by simultaneously moving the three elevating wheel units W radially of the tree T by equal amounts. The tree T is thus located at the centers of the frames F1, F2, and F3 and the gears G1, G2, and G3 when the body B is mounted to the tree T.

The frame F1 has a mainframe F1a and a subframe F1b pivotally connected at an end thereof. A laterally openable plate 4 is pivotally mounted at the frame F2 and F3. Plate 4 acts as a coupling member of frames F2 and F3 to rigidly reinforce the frames F2 and F3, thereby preventing the frames F2 and F3 from twisting or deforming. Ring gears G1 and G2 respectively have main gears G1a, G2a, and subgears G1b, G2b pivotally connected at respective ends thereof. When the body B is mounted to the tree T or removed from the tree T, frame F1b, plate 4, and gears G1b, G2b are opened as shown in FIG. 2 to establish an opening capable of receiving the tree T. After the tree T is passed through the opening and disposed at the center of the body B, a stopper 5 of subframe F1b, a stopper 6 of plate 4, and the stoppers 8 and 9 of subgears G1b, G2b, respectively, are closed as shown in FIG. 1.

The structure of the wheel units W including the linkage mechanism for moving the wheel units W radially with respect to the axis of tree T, the interlocking mechanism for ensuring equal radial movement by each wheel unit W and the pressure equalizing mechanism for ensuring uniform contact pressure between wheel units W and the surface of the tree T will now be described in detail with reference to FIGS. 3-6. Although three sets of the wheel units W are provided, only one of them will be described since all are constructed in the same way.

Each wheel unit W has an erected rectangular plate 11 and four wheels w, two of which are respectively journaled to upper and lower ends of the plate 11. Plate 11 is pivotally mounted to lower ends of supporting rods 12 and 13 which in turn are pivotally coupled at their upper ends to the frame. This mounting scheme allows plate 11 to move forwardly and reversely in radial directions a and b with respect to the tree T. When the plate 11 is moved forwardly in the direction of arrow a, the wheels w contact the surface of the tree T, and when the plate 11 is moved in the direction of arrow b, the wheels w are separated from the surface of the tree T.

Body B has a small gear g1 engaged in mesh with the inside of the ring gear G1. Rotation of small gear g1 is transmitted to bevel gears g2, g3, and a chain 14. The rotation of the engine 1 is thus transmitted through the gears G1, g2, g3, and the chain 14 to the respective wheels w. The drive mechanism for the wheels w will be described in detail later.

A washer 15 projects from the rear of plate 11, and a bearing 16 is coupled to the end of washer 15. A cam 17 is rotatably mounted on a shaft 18 which in turn is mounted to a gear g4 which meshes with the ring gear G3. A coiled spring S1 is mounted on the shaft 18 to bias cam 17 counterclockwise in the direction of arrow c in FIG. 4. The three cams 17 are thus interlocked to each other through the ring gear G3 and the gears g4. When any of the three cams 17 is rotated, shaft 18 transmits the rotation to gears g4. The ring gear G3, which meshes with gears g4, rotates in the direction of arrow d, and the other two gears g4 meshing with ring gear G3 rotate in the same direction and by the same amount, and this rotation is transmitted to the other two cams 17 by respective shafts 18.

Figure 5:
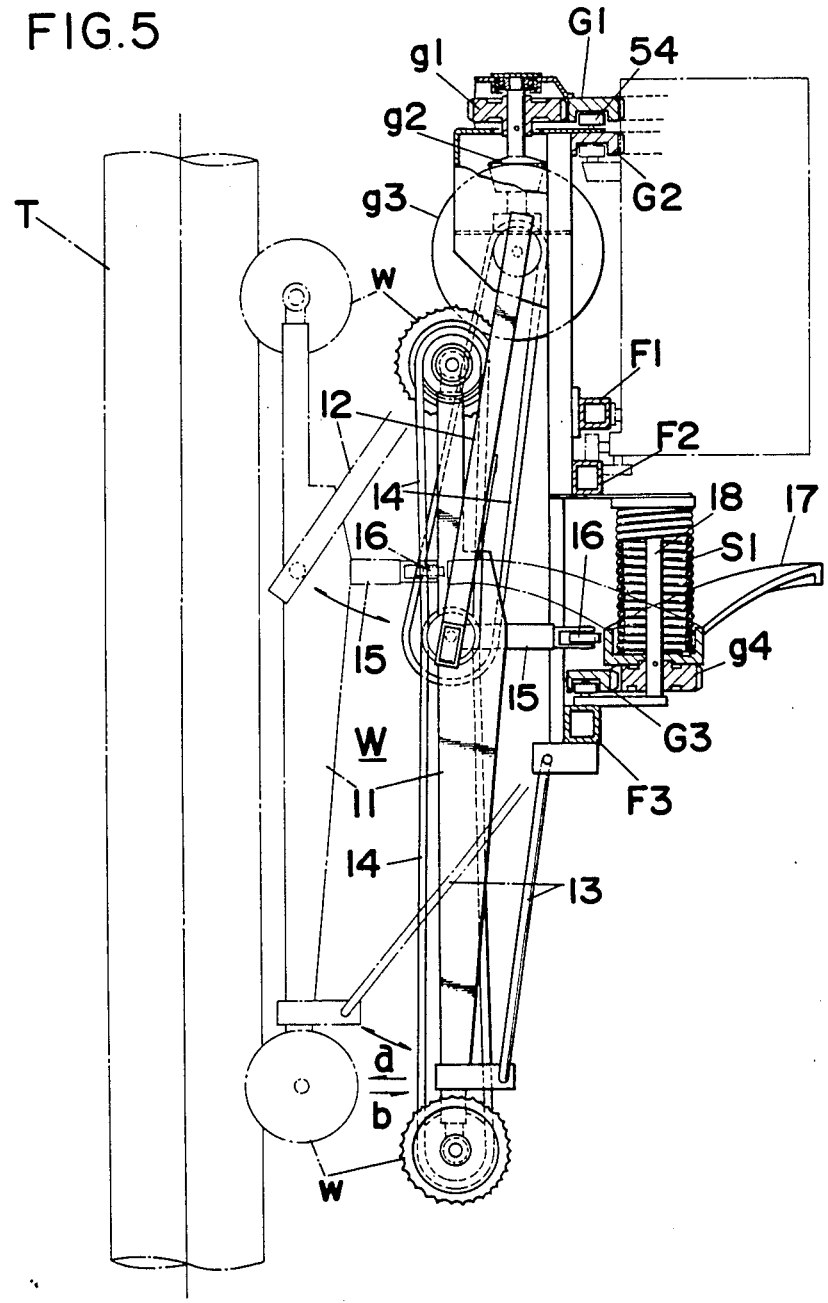
FIGS. 5 and 6 are side and front views of the wheel unit.
Figure 6:
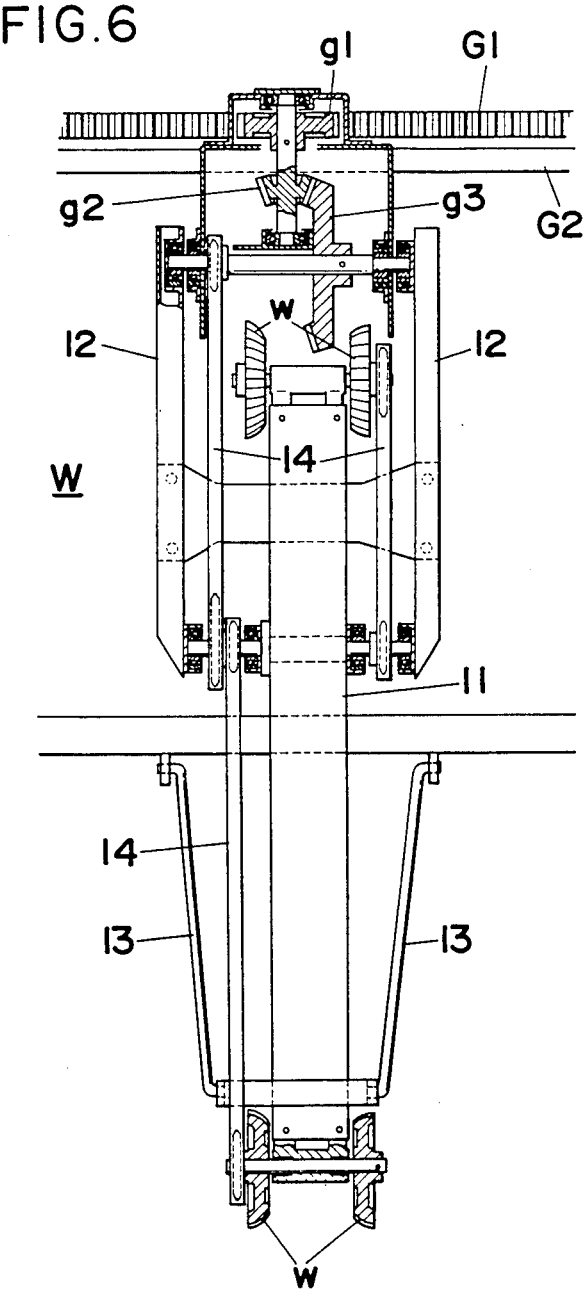

In each wheel unit W, the weight of rods 12 and 13 tend to hold each wheel unit w in the position designated by solid lines in FIG. 5. As each cam 17 rotates, its outer peripheral edge contacts each bearing 16, and each wheel unit W moves in the radial direction a or b. The ring gears G3, the gears g4, and the cams 17 interlock the wheel units W to each other and ensure that the wheel units W move equally in the radial direction a or b with respect to the tree T. Tree T is thus always stably held at the center of tree pruning machine A.

A handle 19 is used for manually rotating the cams 17 when the body B is mounted on the tree T. A gear g5, mounted coaxially on the handle 19, meshes with a gear g6 which in turn meshes with the ring gear G3. When the handle 19 rotates, the gear g6 rotates. Gear g6 causes ring gear G3 to rotate, and the three small gears g4 meshing with gear G3 rotate the cams 17.

Figure 4:
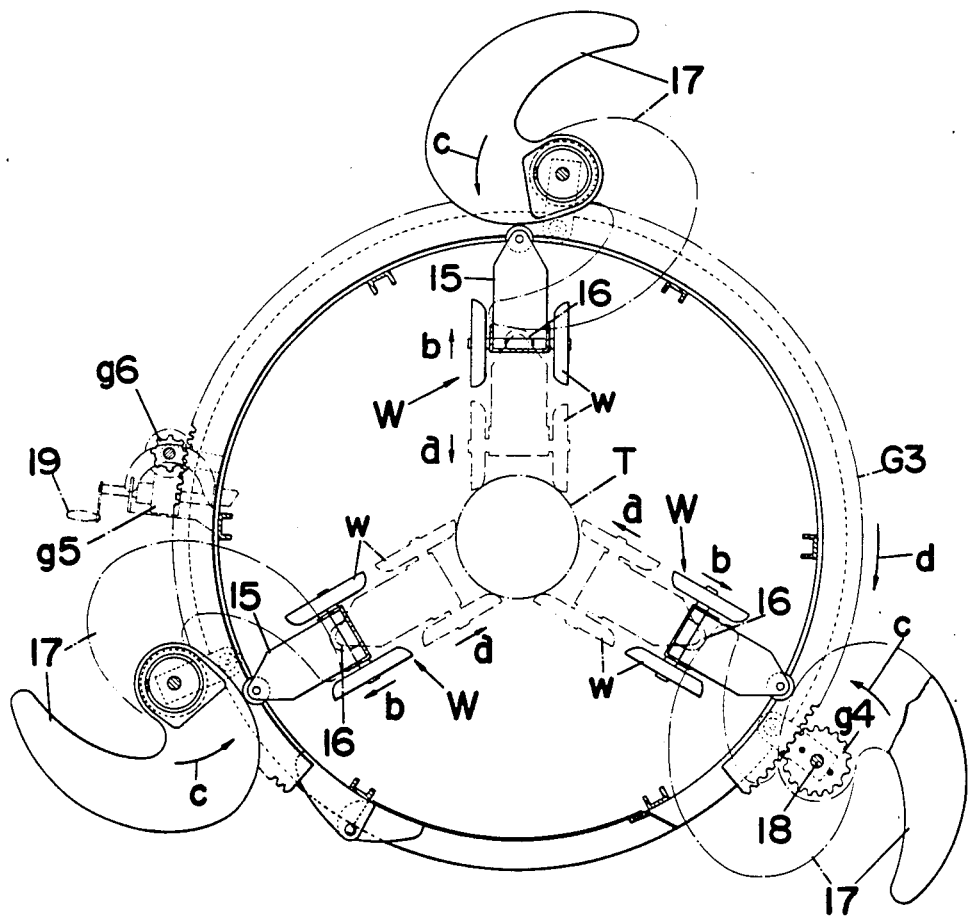

Accordingly, whenever the body B is to be set to or removed from the tree T, handle 19 is operated to rotate the cams 17 to the position designated by the solid line in FIG. 4 against the tension of springs S1. As a result, the weight of each wheel unit W causes them to move radially outward in the direction of arrow b and remain in the position designated by the solid line in FIG. 5. After the tree T is disposed through the opening at the center of the body B, handle 19 is released and the tension in springs S1 cause cams 17 to rotate counterclockwise in the direction of arrow c in FIG. 4. Cams 17 press against bearings 16 and washers 16, causing the wheel units W to move radially inward toward the tree T (in the direction of arrow a) and the wheels w press against the surface of the tree T with equal pressure. When the gears g6 and G3 are disengaged, the pruning machine A is ready for operation, and when the wheels w are rotated by the engine 1 the body B climbs the tree T.

Typically, tree T will gradually decrease in diameter toward the top. If the tree T decreases in diameter as the pruning machine A climbs the tree T, the wheels w of the respective wheel units W move forwardly in the direction of arrow a under tension of springs S1 to maintain sufficient contact pressure with the surface of the tree T. On the other hand, when tree T gradually increases in diameter as the pruning machine A descends it, wheel units W gradually spread outwardly in the direction of arrow b against the tension of the springs S1, and the wheels w maintain reliable contact pressure with the surface of the tree T.

The operation of the tree pruning machine A will now be described with reference to FIGS. 7-12.

Figure 7:
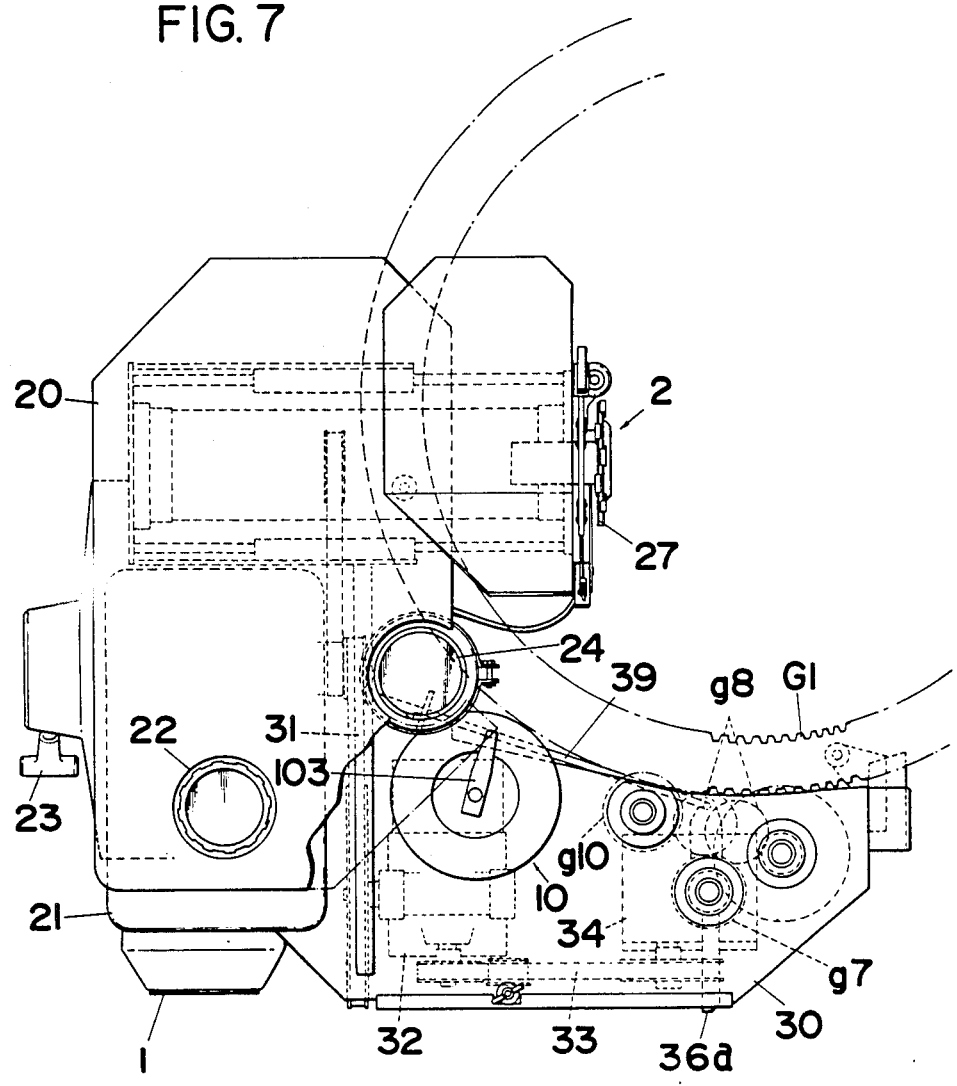
FIGS. 7 and 8 are partial plain and side views of the wheel unit.
Figure 8:
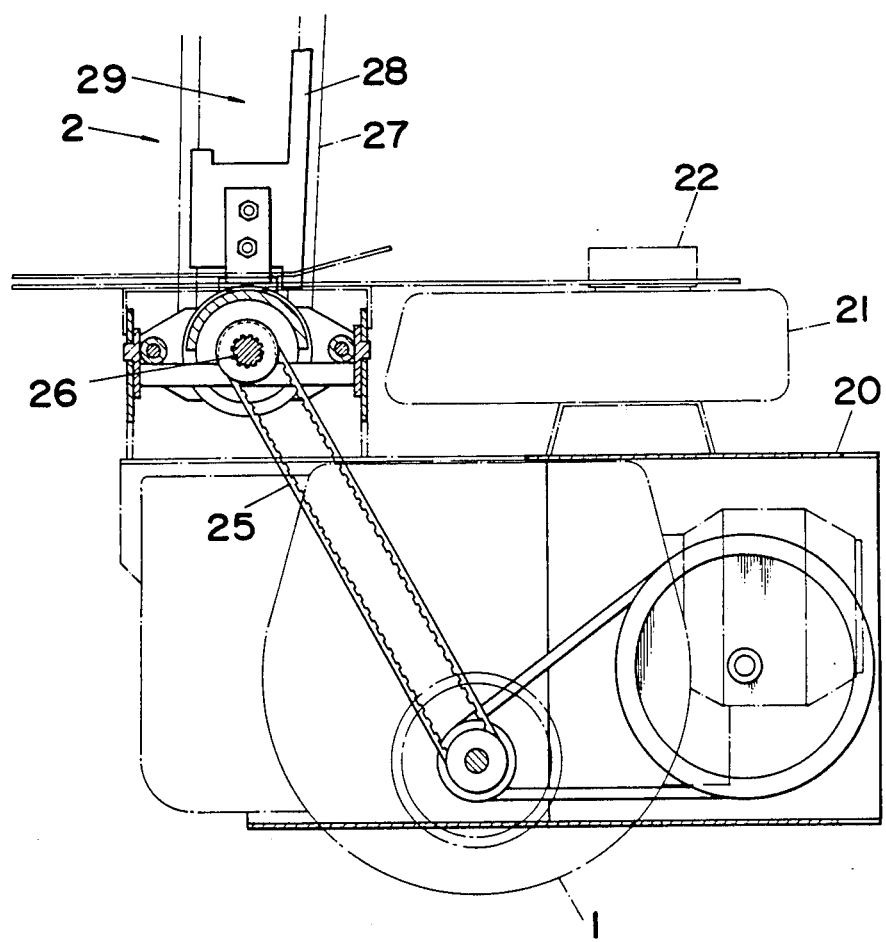

As shown in FIGS. 7 and 8, engine 1 is mounted under a chassis 20. Engine 1 includes a gasoline tank 21 having a cap 22, a lever 23 for starting the engine, and an oil tank 24. Engine 1 drives the elevating wheels w and the cutting unit 2. The power of the engine 1 is transmitted to the cutting unit 2 by a belt 25 and a drive shaft 26 which drives a chainsaw 27 rotating along the outer peripheral edge of a chain bar 28. A notch 29 is formed in chain bar 28 by cutting out the side of the chain bar 28 for preventing the chain bar 28 from being interposed between branches t as they are cut.

A power transmission mechanism to the elevating wheels w will now be described.

Figure 9:
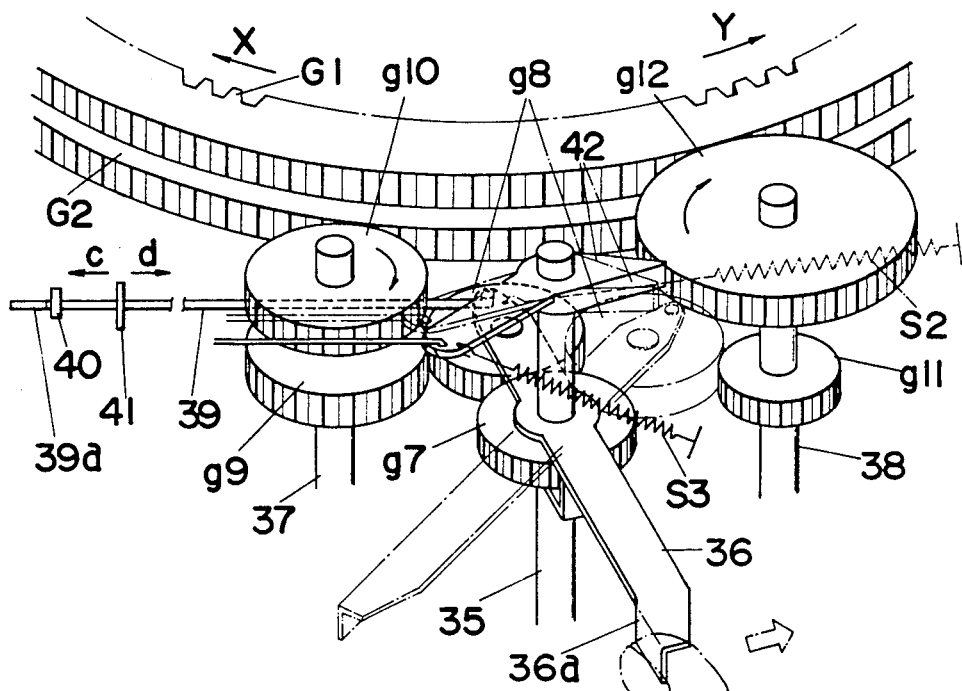
FIGS. 9 and 10 are perspective views of a transmission.

As shown in FIG. 7, rotation of engine 1 is transmitted through a belt 31, a reduction gear 32, a belt 33, and a reduction gear 34 arranged in a box 30. Reduction gear 34 is coupled to a rotational shaft 35 upon which is mounted a gear g7, as shown in FIG. 9. Movably mounted on the shaft 35 directly above the gear g7 is a lever 36 extending to the side of the ring gears G1 and G2. The rear end of the lever 36 comprises an operation unit 36a which is exposed from box 30 (FIG. 1), and which can be operated by the end of a finger. A gear g8 is journaled on the lever 36 and meshes with gear g7 so that engine 1 drives gears g8 through the gear g7. Rotational shafts 37 and 38 are disposed at both sides of the shaft 35, and gears g9 and g10, g11, and g12 are respectively mounted on the shafts 37 and 38. Gear g8 is disposed at the same level as the gears g9 and g11. Gear g10 engages in mesh with the ring gear G2, and the gear g12 engages in mesh with the ring gear G1.

A tension spring S2 is mounted at the end of lever 36 to bias gear g8 toward gear g11. An operation lever 39 is coupled to the end of lever 36 and extends through a guide member 41. As shown in FIG. 9, lever 36 can be rotated counterclockwise against the tension of the spring S2 by pressing a finger against the operation unit 36a. As a result, a projection 39a at the end of rod 39 engages with a projection 40, and the gear g8 meshes with gear g9 and causes gear g10 to rotate clockwise.

A compression spring S3 having lesser tension than spring S2 is mounted at the rear end of an anchoring plate 42 mounted on shaft 35 for biasing plate 42 counterclockwise. Plate 42 rotates together with lever 36, and the end of plate 42 meshes with gear g12 to prevent gear g12 from rotating when gear g8 meshes with gear g9. Since ring gear G2 is non-rotatably fixed to the frame, the rotary device C rotates around the ring gear G2 (i.e., around the tree T) in the direction of arrow X as a result of gear g10 being driven by engine 1 and meshing with the stationary ring gear G2. In other words, the ring gear G2 becomes the locus for rotating the rotary device C around the body B so that rotary device C cuts the branches t projecting from tree T as body B climbs the standing tree T.

Figure 10:
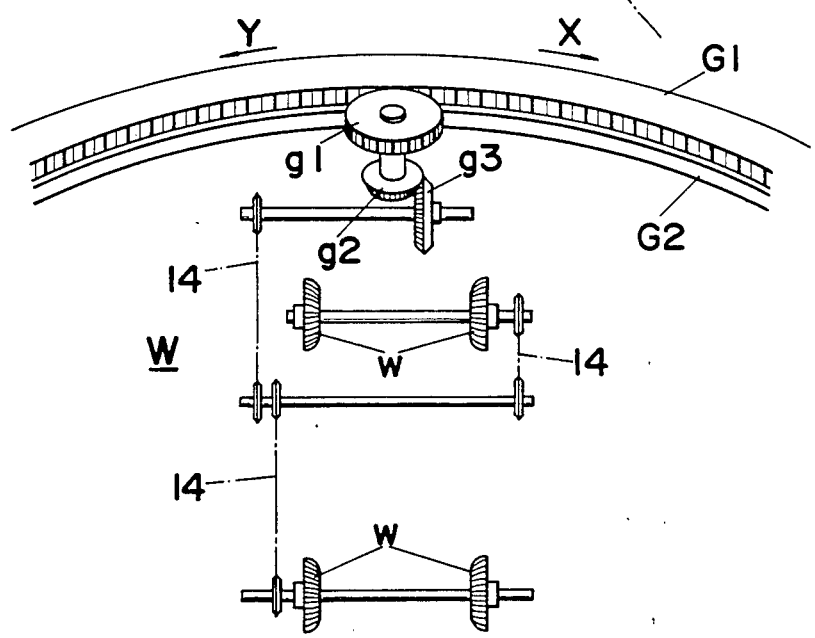

As the gear g10 rotates around the ring gear G2, gear g12 is prevented from rotating by plate 42, as discussed above. Accordingly, ring gear G1, which meshes with gear g12, is towed by gear g12 and rotates in the direction of arrow X around the tree T together with the gear g10. As shown in FIG. 10, rotation of ring gear G1 is transmitted to gear g1 which meshes with the inside of G1. The rotation of gear g1 is transmitted through the bevel gears g2, g3, and the chain 14 to the wheels w. The rotating wheels w, which press against the surface of standing tree T, cause body B to climb the tree T while the rotary device C rotates around the body B and the cutting unit 2 cuts the branches t.

Figure 13:
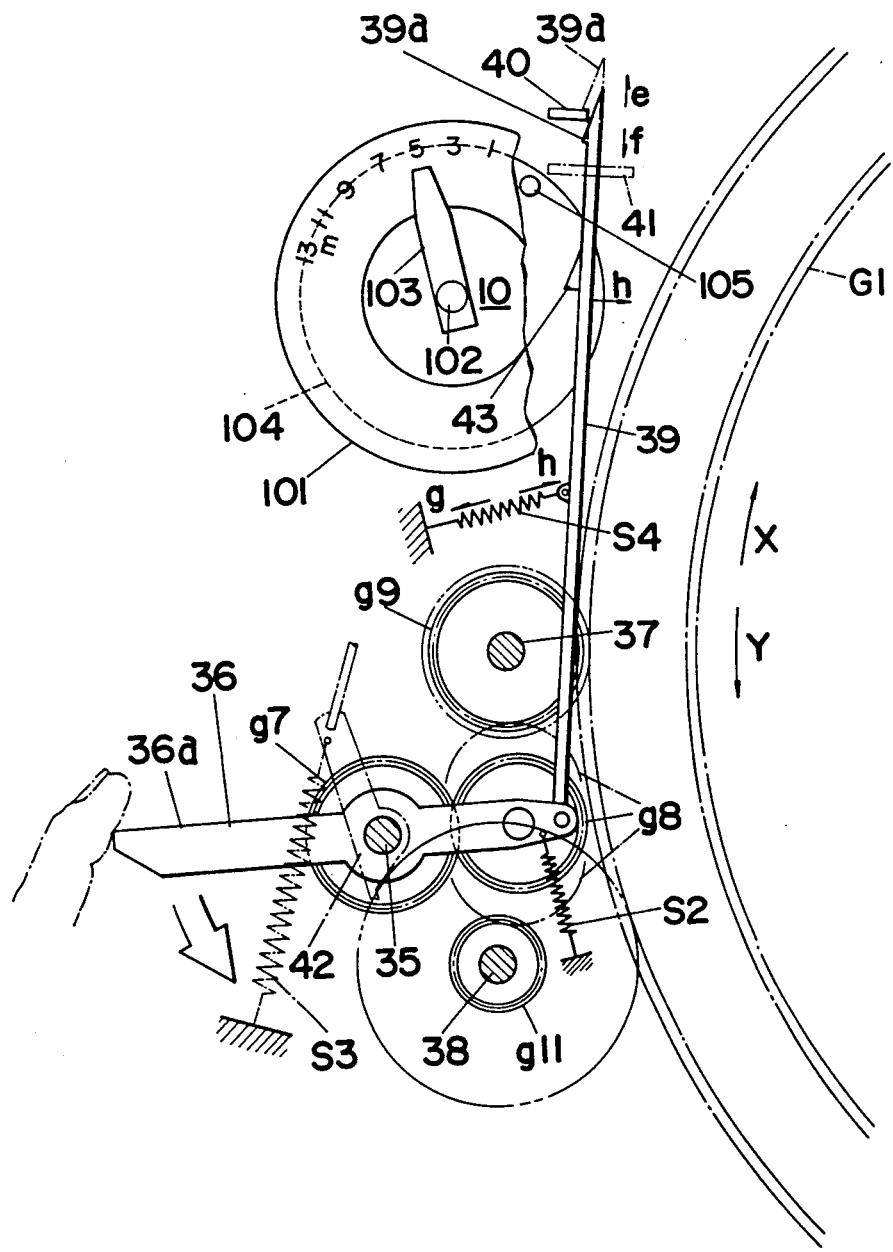
FIG. 13 is a plain view of a climbing height setter.

In operation, the pruning machine A is set to the tree T and the operation unit 36a is pressed to rotate the lever 36 counterclockwise, as shown in FIGS. 9 and 13. Rod 39 moves in the direction of arrow c against the tension of spring S2, and the projection 39a at the end of rod 39 is secured to projection 40 on the frame, causing gear g8 to mesh with gear g9. Accordingly, the rotation of engine 1 is transmitted through belt 25 to the cutting unit 2 and through belt 31 and reduction gears 32, 33, 34 to gear g7. The rotation of gear g7 is further transmitted through gears g8 and g9 to gear g10, and gear g10 rotates in the direction X along the ring gear G2.

Since plate 42 meshes with gear g12, gear g12 does not rotate. Therefore, when gear g10 rotates along the direction of arrow X, causing rotary device C to likewise rotate in the direction of arrow X along the ring gear G2, ring gear G1 is towed by gear g12 to rotate in the direction of arrow X around the tree T. The rotation of the gear G1 is transmitted through the gears g1, g2, g3 and the chain 14 to the wheels w of the respective wheel units W, and the rotation of wheels w causes pruning machine A to climb the tree T at a constant speed.

Figure 12:
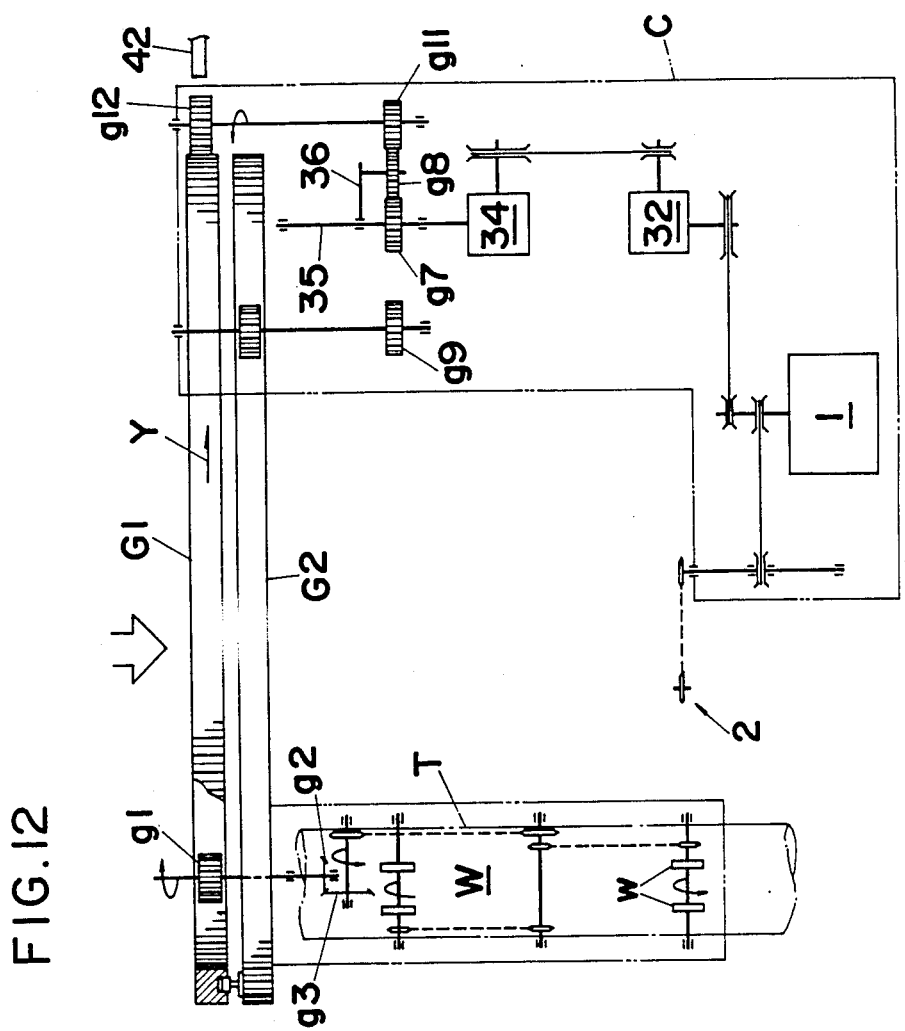

The mechanism for changing the tree pruning machine A from the climbing mode to the descending mode will now be described with reference to FIGS. 12 and 13.

Disposed within box 30 is a timer unit 10 for setting the climbing height of the tree pruning machine A. Timer unit 10 includes a dial plate 101, a dial knob 103 mounted on a rotational shaft 102 at the center of the plate 101, and spiral springs and gears (not shown). Height settings, in meters, are marked by numerals (1–13) on the upper surface of plate 101. Timer unit 10 is typically a spiral spring type clock of well known construction and, since such clocks have a number of spiral springs and gears associated therewith, a detailed description of its structure will be omitted. It is sufficient to say that knob 103 is manually rotated counterclockwise against the tension of one such spiral spring in box 30 and matched to a desired numeral (e.g., 5 meters, as shown), and the knob 103 subsequently slowly rotates clockwise by the tension of the spiral spring.

As discussed above, one end of operation rod 39 is journaled to the end of the lever 36, and the other end of rod 39 has projection 39a extending therefrom. When operation unit 36a is manually operated to move the rod 39 in the direction of arrow e and to secure the projection 39a to the projection 40 on the frame, the gear g8 rotates around the shaft 35 and meshes with gear g9 (designated by a chain line in FIG. 13). Rod 39 is biased in the direction of arrow g toward timer unit 10 by the tension of a spring S4, so the initial coupling of projection 39a to projection 40 is maintained. Normal rotation is transmitted to the wheels w, and the pruning machine A climbs the tree T.

Timer 10 includes a disk 104 having a projection 105 extending from the upper surface thereof. Disk 104 rotates together with knob 103. When knob 103 is rotated to set the desired height and subsequently released, knob 103 and disk 104 rotate slowly clockwise. When the pruning machine A climbs to the set height, projection 105 contacts a projection 43 extending from a side of the rod 39 and pushes the rod 39 in the direction of arrow H. Consequently, projection 39a separates from projection 40 and is pulled by the tension of spring S2 in the direction of arrow f. As a result, gear g8 rotates clockwise around shaft 35 by the tension of spring S2, away from gear g9, and meshes with gear g11. At the same time, plate 42 rotates clockwise together with lever 36, away from gear g12, and gear g12 is allowed to rotate. (See FIG. 9).

Figure 11:
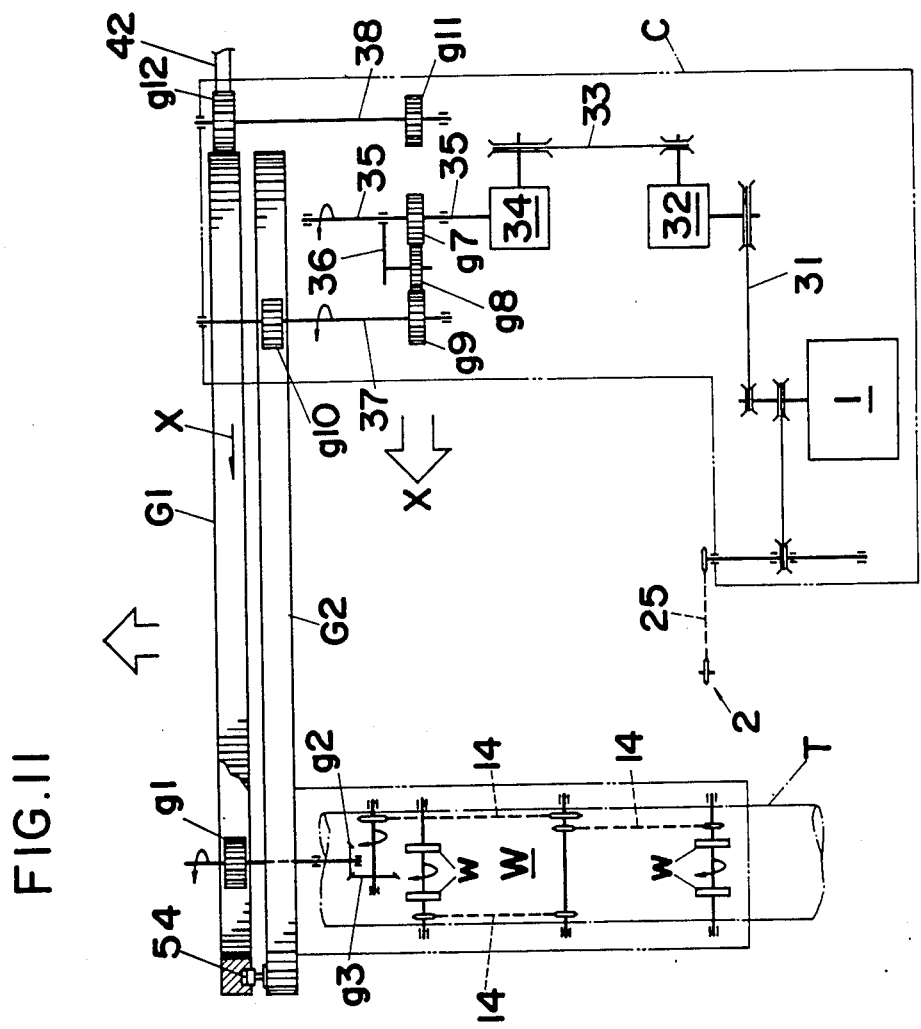
FIGS. 11 and 12 are developed views of the transmission.

Converting the pruning machine A from the climbing mode to the descending mode will now be described with reference to FIGS. 11 and 12.

When gear g8 meshes with gear g9, rotation of engine 1 to wheels w causes pruning machine A to climb the standing tree T. As pruning machine A climbs tree T, projection 105 of the timer unit 10 slowly rotates clockwise, as shown in FIG. 13. When pruning machine A arrives at the height set by the timer unit 10, the projection 105 contacts projection 43 and pushes the rod 39 in the direction of arrow h against the tension of spring S4. When projection 39a clears projection 40, the tension of spring S2 causes rod 39 to move in the direction of arrow f, causing gear g8 to separate from gear g9 and mesh with gear g11. Gear g9 stops rotating, and rotary device C stops rotating around ring gear G2, thereby finishing the cutting of the branches t by the cutting unit 2.

The rotation of the engine 1 is thereafter transmitted through gear g8 to the gears g11 and g12. Gear g12 rotates clockwise, as shown in FIG. 9, and gear g1, which meshes with gear g12, is rotated in the direction of arrow Y. Then, as shown in FIG. 10, gear g1, which meshes with the inside of gear G1, rotates counterclockwise, and this rotation is transmitted through gears g2, g3, and chain 14 to the wheels w. The wheels w rotate in reverse, and the pruning machine A descends the standing tree T.

The number of teeth on gear g11 is less than that of gear g9. Therefore, ring gear G1 rotates considerably faster in the Y direction than in the X direction and drives wheels w considerably faster during decent than during ascent. In other words, gears g8, g9, and g11 also comprise a speed shifting transmission so that the pruning machine A cuts the branches t while slowly climbing the tree T and rapidly descends the tree T after the tree pruning work is finished.

Figure 14:
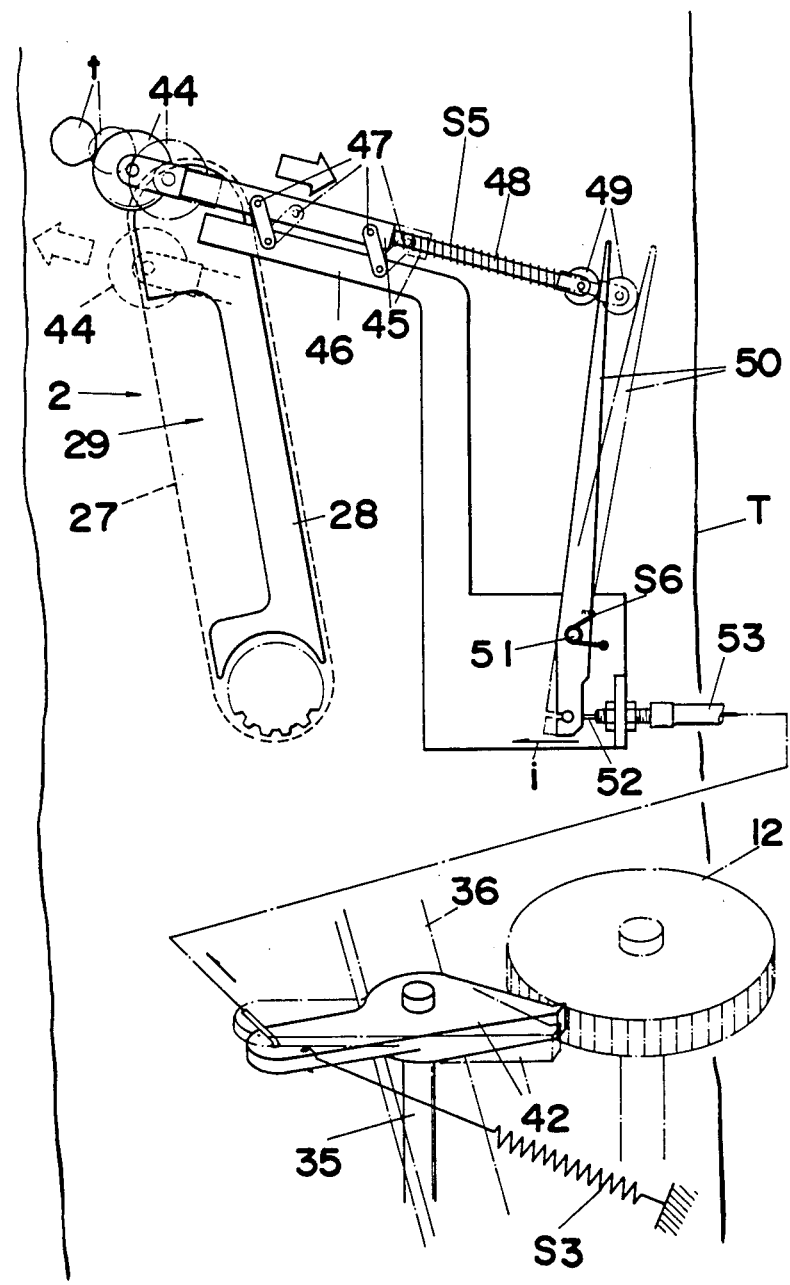
FIG. 14 is a side view of a device for temporarily stopping power transmission to the wheel units.

FIG. 14 shows a device for temporarily stopping the transmission of power to the wheels w. A roller 44 is mounted at the end of a frame 45 for sensing a branch t. Roller 44 and frame 45 are telescopically biased forwardly and upwardly of the cutting unit 2 by a spring S5. When roller 44 makes contact with the branches t of the tree T, the transmission of the rotation of the engine 1 to the elevating wheels w is temporarily stopped by a mechanism which will be described in detail later. As a result, the weight of the pruning machine A causes it to move down slightly and avoid contact between branches t and the top E of the cutting unit 2. (FIG. 1).

Frame 45 is pivotally supported to a frame 46 by links 47. Spring S5 is disposed on a mounting rod 48 extending from the back of frame 45. A roller 49 is mounted at the rear of mounting rod 48 and contacts the top of a vertical rod 50. The lower portion of rod 50 is rotatably journaled by a pin 51 to the lower portion of the frame 46, and rod 50 is elastically biased counterclockwise by a spring S6. A wire 52, mounted at the lower end of rod 50, passes through a projecting pipe 53 and mounts to the rear of plate 42 which is journaled to the shaft 35. Plate 42 is biased by spring S3 toward gear g12 to prevent gear g12 from rotating, but when the wire 52 is pulled in the direction of arrow i and the plate 42 rotates clockwise, plate 42 disengages from gear g12 and allows it to rotate.

Operation of the foregoing device shall now be described with reference to FIG. 14.

Cutting unit 2 cannot adequately cut the branch t at the upper end E. Therefore, when branch t contacts cutting unit 2 at its upper end, branch t contacts roller 44 but does not contact chain saw 27. When branch t contacts roller 44, roller 44 moves backwardly against the tension of spring S5 and roller 49 pushes against rod 50, causing rod 50 to rotate clockwise (designated by chain lines in FIG. 14). Wire 52 is pulled in the direction of arrow i, plate 42 rotates clockwise, and the end of plate 42 disengages from gear g12. Gear g12 starts idling, thereby stopping the transmission of power to the wheels w from the ring gear G1 meshing with gear g12, and pruning machine A descends by its own weight.

When roller 44 is away from the branch t (as designed by broken lines in FIG. 14), it projects forwardly by the compression of spring S5, and rod 50 rotates counterclockwise and returns to its original position. Consequently, plate 42 rotates counterclockwise by the operation of spring S3, and the end of plate 42 re-engages with gear g12. Rotation of gear g12 is stopped, ring gear G1 is again pulled by gear g12 and rotates in the direction of arrow X, the wheels w rotate again, the pruning machine A climbs the tree T, and the branch t is cut by the center of the cutting unit 2. In short, the branch t contacting the upper end E of the cutting unit 2 contacts roller 44, power to the wheels is temporarily stopped by the backward movement of roller 44, the pruning machine A moves down slightly by its own weight, away from branch t, power to the wheels w is restored, and the branch t can be cut by the center of the cutting unit 2.

The invention has now been described with reference to specific embodiments. Various modifications and substitutions will be apparent to persons skilled in the relevant arts. Accordingly, it is not intended that the invention be limited except as provided by the appended claims.

What is claimed is:

1. A tree pruning machine comprising:

a generally annular body;

means for detachably mounting the body to a standing tree;

a cutting unit detachably mounted on the body;

means for rotating the cutting unit around a periphery of the body;

means for elevating the body vertically on the tree, the elevating means including at least 3 radially moveable wheel units coupled to the body and having a plurality of upper and lower wheels capable of rotation along a surface of the tree;

means for simultaneously moving the wheel units by the same radial distance; and means for biasing the wheel units equally against the surface of the tree.

2. A tree pruning machine comprising:

a generally annular body;

means for detachably mounting the body to a standing tree;

a cutting unit detachably mounted on the body;

means for rotating the cutting unit around a periphery of the body;

means for elevating the body vertically on the tree, the elevating means including at least three radially moveable wheel units coupled to the body and having a plurality of upper and lower wheels capable of rotation along a surface of the tree;

means for simultaneously moving the wheel units by the same radial distance;

means for biasing the wheel units equally against the surface of the tree;

means for detecting a prescribed height of the body on the tree; and means, responsive to the detecting means and coupled to the elevating means, for reversing a direction of rotation of the upper and lower wheels of each wheel unit.

* * * * *